May 6, 1958     B. H. PINCKAERS     2,833,938
CONDITION RESPONSIVE APPARATUS
Filed Nov. 29, 1956
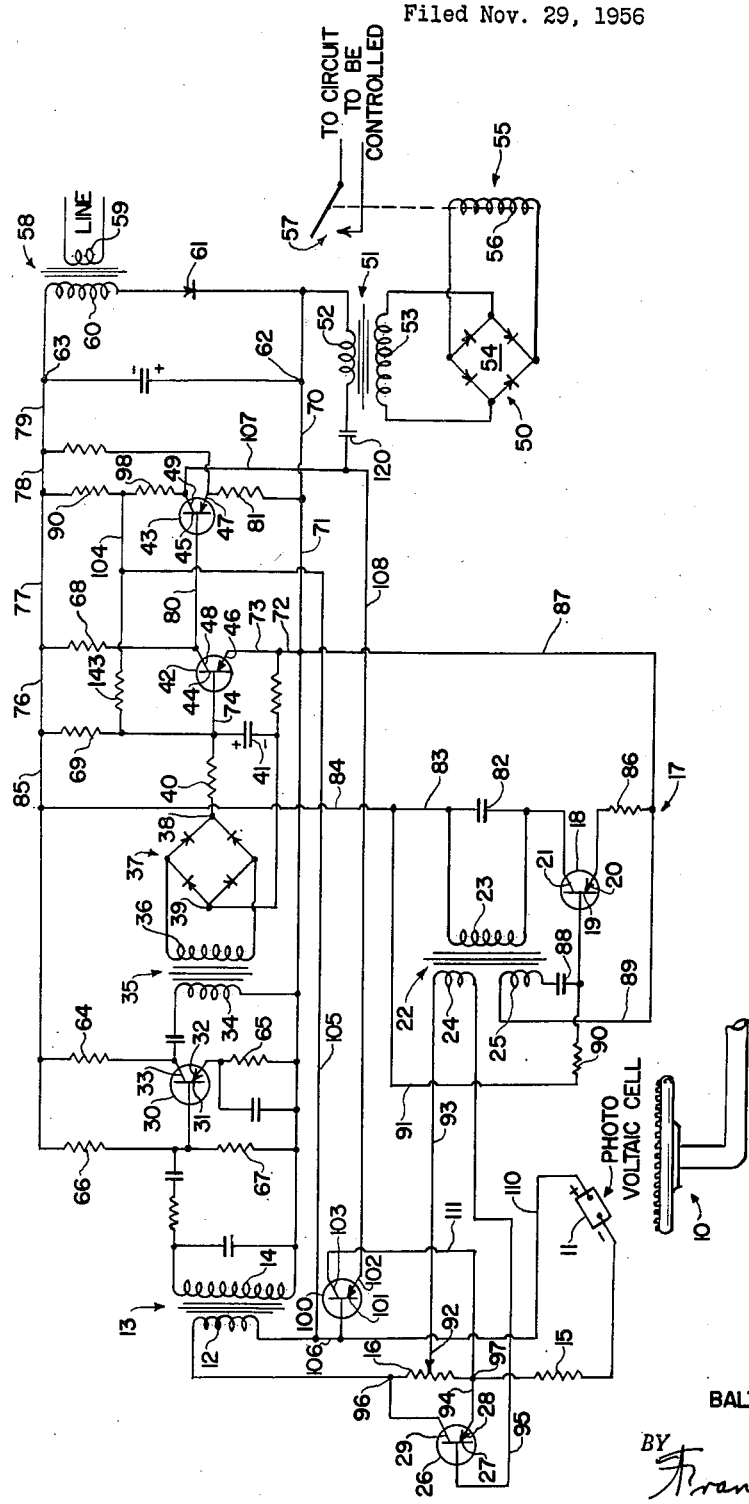
INVENTOR.
BALTHASAR H. PINCKAERS
BY
ATTORNEY

United States Patent Office 2,833,938
Patented May 6, 1958

---

2,833,938

CONDITION RESPONSIVE APPARATUS

Balthasar H. Pinckaers, Minneapolis, Minn., assignor to Minneapolis-Honeywell Regulator Company, Minneapolis, Minn., a corporation of Delaware Application November 29, 1956, Serial No. 625,156

7 Claims. (Cl. 307—88.5)

The present invention is concerned with an improved condition responsive apparatus and more particularly with an improved condition apparatus wherein means are provided to check the proper operation of the apparatus.

Conventionally, a condition responsive apparatus includes a condition sensing device, means to transmit the signal received from the condition sensing device, and an output means of one form or another which is controlled in accordance with the presence or absence of a given condition to which the condition sensing device is subjected. However, with this type of a system, it is possible for one or more of the components of the system to fail such that the system falsely detects the presence or absence of the given condition. Obviously, such a system is not completely reliable and, depending upon the particular application, the results of such a failure may possibly be quite disastrous.

The present invention is particularly concerned with the provision of a condition responsive apparatus wherein means are provided to continuously cycle the apparatus, first rendering the apparatus sensitive to the given condition and then rendering the apparatus insensitive to the given condition. If the condition sensing means is in fact subjected to the given condition, the condition responsive apparatus then cyclically detects the given condition and detects the simulated absence of the given condition. The output of the condition responsive apparatus is so constructed and arranged that it is responsive only to the continued cycling condition wherein the given condition and then the simulated absence of the given condition is detected. In this manner, the improved condition responsive apparatus is continuously checked to insure that a component failure has not occurred which causes the condition responsive apparatus to falsely indicate either the presence or absence of the given condition.

It is an object of the present invention to provide an improved condition responsive apparatus having condition sensing means arranged to provide a direct current voltage upon being subjected to a given condition and furthermore having a flip-flop type electrical circuit which is triggered from a first condition to a second condition upon the condition sensing means being subjected to the given condition. The flip-flop circuit further controls means which renders the condition responsive means inoperative to sense the given condition and thereby upon the condition responsive means in fact being subjected to the given condition, the flip-flop circuit operates in a cyclic manner. Further means are provided to be controlled by the flip-flop circuit only upon the flip-flop circuit cycling between its first and second condition.

It is a further object of the present invention to provide an improved flame detecting apparatus having a photo voltaic cell capable of generating a direct current voltage upon being subjected to electromagnetic wave energy emitted from a flame. This direct current voltage is transformed to an alternating voltage, rectified, integrated and then applied to the base and emitter electrodes of a transistor to cause the transistor to become nonconductive in the presence of such a voltage. This transistor has its collector electrode connected to the base electrode of a further transistor and upon the first mentioned transistor being rendered nonconductive, the second mentioned transistor is rendered conductive. The output of the second mentioned transistor is connected to a further transistor which shunts the photo voltaic cell to thereby simulate the absence of flame upon the second transistor becoming conductive. Further means are provided including a transformer having a primary winding and a capacitor connected to the collector electrode of the second transistor to thereby cause a voltage to be induced in the secondary winding of the transformer only upon the second transistor alternately assuming a conducting and then a non-conducting state.

These and other objects of the present invention will be apparent upon reference to the following specification, claims, and drawing, of which the single figure is a schematic representation of the improved condition responsive apparatus.

Referring to the single figure, the reference numeral 10 designates generally a fuel burner at which a flame may be established, by means not shown. Associated with the fuel burner 10 is a condition sensing means in the form of a photo voltaic cell 11. The photo voltaic cell 11 is positioned relative to the burner 10 such that upon a flame being present at the burner 10 the electromagnetic wave energy emitted by the flame impinges upon the photo voltaic cell. As is well known, a photo voltaic cell is effective to generate a direct current voltage upon being subjected to electromagnetic wave energy. The particular cell 11 is connected such that the polarity of the generated voltage is as shown in the single figure.

The positive terminal of photo voltaic cell 11 is connected to the lower terminal of the secondary winding 12 of transformer 13, which transformer has a secondary winding 14. The negative terminal of the photo voltaic cell 11 is connected through a resistor 15 and a potentiometer 16 to the upper terminal of the primary winding 12. In this manner, the output voltage of photo voltaic cell 11 is applied to the primary winding 12 of transformer 13. However, as above explained, the photo voltaic cell inherently generates a direct current voltage and such a voltage is blocked by transformer 13. In other words, a direct current voltage flowing through the primary winding 12 does not induce the voltage in the secondary winding 14.

Therefore, means is provided to chop this direct current voltage and comprises an oscillator designated generally by the reference numeral 17.

This oscillator 17 includes a transistor 18 having a base electrode 19, an emitter electrode 20, and a collector electrode 21. The reference numeral 22 designates a transformer having windings 23, 24 and 25 which are associated with transistor 18 in a manner to form an oscillator, the operation of which will be described later.

Transformer winding 24, which is essentially the output of oscillator 17, is connected to a further transistor 26 having a base electrode 27, an emitter electrode 28, and a collector electrode 29. As can be seen from the single figure, the emitter to collector impedance of transistor 26 is connected in parallel with the resistance element of potentiometer 16. In the manner to be described more completely, the emitter to collector impedance of transistor 26 is cycled between a relatively high and a relatively low value to thereby effectively change the resistance of the circuit connecting photoelectric cell 11 to the primary winding 12 of transformer 13 and in this manner to effectively chop the direct current voltage generated by the photo voltaic cell 11.

The reference numeral 30 designates a transistor having a base electrode 31, an emitter electrode 32, and a collector electrode 33. Transistor 30 and its associated electrical components form an amplifying stage to amplify the alternating voltage induced in the secondary winding 14 of transformer 13. This amplified voltage is applied to the primary winding 34 of a coupling transformer 35 having a secondary winding 36 connected to a bridge rectifier designated generally by the reference numeral 37.

The output of bridge rectifier 37 exists between terminals 38 and 39. Series connected resistor 40 and capacitor 41 are connected across the output terminals of the bridge rectifier 37 and the voltage present across capacitor 41 is the integration of the output voltage of bridge rectifier 37. In other words, resistor 40 and capacitor 41 form integrating means with the output existing across capacitor 41. This connection is such that the upper terminal of capacitor 41 is charged positive with respect to the lower terminal upon an alternating voltage being induced in the secondary winding 36 of coupling transformer 35.

The reference numerals 42 and 43 designate further transistors each having base electrodes 44 and 45, emitter electrodes 46 and 47, and collector electrodes 48 and 49. The two transistors 42 and 43 are connected in a flip-flop circuit by associated electrical components, as will be described.

The reference numeral 50 designates generally an output means of the improved condition responsive apparatus and includes a transformer 51 having a primary winding 52 and a secondary winding 53. A bridge rectifier, designated generally by the reference numeral 54, is connected to the secondary winding 53 of transformer 51 and a relay 55 having a winding 56 and switch means 57 is provided with its winding 56 connected to the output of the bridge rectifier 54. As designated by the legend on the single figure, the switch means 57 of relay 55 is provided to control a circuit in accordance with the condition to which the photo voltaic cell 11 is subjected. A great variety of safety or control functions may be performed by the switch means of relay 55 and the exact manner in which this switch means is utilized forms no part of the present invention.

Electrical power for the operation of the condition responsive apparatus is obtained from a transformer designated by the reference numeral 58. This transformer has a primary winding 59 connected to a source of alternating voltage, not shown. Upon primary winding 59 being connected to such a source of voltage, an alternating voltage is induced in the secondary winding 60. This alternating voltage is rectified by means of a rectifier 61 and a direct current supply voltage is established across terminals 62 and 63, terminal 62 being the positive terminal and terminal 63 being the negative terminal.

Considering now the individual transistors 30, 42, and 43, transistor 30 has its collector electrode 33 connected to the negative terminal 63 through a load resistor 64. The emitter electrode 32 of this transistor is connected to the positive terminal 62 through a resistor capacitor combination 65. The base electrode 31 of this transistor is connected to the junction of voltage dividing resistors 66 and 67, which resistors are connected across the terminals 62 and 63 of the power supply. This connection is such as to bias the base electrode 31 negative with respect to the emitter electrode 32.

Transistor 42 has its collector electrode 48 connected to the negative terminal 63 through a load resistor 68. The emitter electrode 46 of this transistor is connected directly to the positive terminal 62 of the power supply and the base electrode 44 is connected through a resistor 69 to the negative terminal 63 of the power supply. These connections are such that with no voltage present across capacitor 41, that is with no flame present at the burning unit 10, the base electrode 44 is connected to a negative potential whereas the emitter electrode 46 is connected to a positive potential. This causes an emitter to base current to flow from terminal 62 through conductors 70, 71, 72 and 73, emitter 46 and base 44, conductors 74 and 75, resistor 69, and conductors 76, 77, 78 and 79 to the negative terminal 63 of the power supply. A current likewise flows from the emitter 46 to the collector 48 through a circuit which can be traced from positive power supply terminal 62 through conductors 70, 71, 72 and 73, emitter 46 and collector 48, resistor 68, and conductors 77, 78 and 79 to the negative terminal 63 of the power supply.

The base electrode 45 of transistor 43 is directly connected by means of conductor 80 to the collector electrode of transistor 42. The emitter electrode 47 of transistor 43 is connected through the resistor 81 to the positive terminal 62 of the power supply and also to the emitter electrode 46 of transistor 42. Since transistor 42, nonconductive, has a relatively low emitter to collector impedance, the voltage present across these elements is low, in fact substantially zero.

This effectively causes transistor 43 to be cut off, that is, no current flows from the emitter 47 to the collector 49.

Considering now the detailed operation of the oscillator 17, the collector electrode 21 of transistor 18 is connected through the winding 23 of transformer 22, which is shunted by capacitor 82, and conductors 83, 84, 85, 76, 77, 78 and 79 to the negative terminal 63 of the power supply. The emitter electrode 20 is connected through a resistor 86 and conductors 87, 71 and 70 to the positive terminal 62 of the power supply. The base electrode 19 of transistor 18 is connected to a capacitor 88, winding 25 of transformer 22, conductor 89, and resistor 86 to the emitter electrode 20 of this transistor. Also, the base electrode 19 of transistor 18 is connected through a resistor 90 and conductors 91, 84, 85, 76, 77, 78 and 79 to the negative terminal of the power supply. Due to the above traced circuits, the transistor 18 is initially effective to cause an emitter to base current to flow through a circuit which can be traced from the positive power supply terminal 62 through conductors 70, 71 and 87, resistor 86, emitter 20 and base 19, resistor 90, and conductors 91, 84, 85, 76, 77, 78 and 79 to the negative terminal 63 of the power supply. Such a current flow likewise causes a current to flow from the emitter 20 to the collector 21. This current flow circuit can be traced from the power positive power supply terminal 62 through conductors 70, 71 and 87, resistor 86, emitter 20 and collector 21, transformer winding 23, and conductors 83, 84, 85, 76, 77, 78 and 79 to the negative terminal 63 of the power supply.

The phasing of the windings 23 and 25 of transformer 22 is such that with a current of an increasing magnitude flowing through the winding 23, the voltage induced in the winding 25 causes the lower terminal thereof to be positive with respect to the upper terminal. This places a positive voltage on the base electrode 19 and a negative voltage on the emitter electrode 20 of transistor 18, thus tending to cut off the transistor 18. This in turn causes the emitter to collector current of transistor 18 to decrease. As this current decreases the voltage induced in the winding 25 reverses polarity, that is the lower terminal becomes negative with respect to the upper terminal. This reversed polarity is such as to tend to drive the base electrode 19 negative with respect to the collector electrode 20. This in turn causes the emitter to collector current of transistor 18 to again increase. In this manner, the emitter to collector current of transistor 18 varies in a cyclic manner, first building up in magnitude and then reducing in magnitude. This is then essentially an oscillator and an alternating voltage is induced in the winding 24 of transformer 22.

The voltage induced in winding 24 is applied between the base electrode 27 of transistor 26 and the movable tap 92 of potentiometer 16. Considering first the half cycle of the alternating voltage in which the upper terminal of this winding is positive with respect to the lower terminal, a negative voltage is applied to the base electrode 27 of transistor 26 whereas a positive voltage is applied to both the collector electrode 28 and the emitter electrode 29 of this transistor. The relative magnitude of the voltages on the emitter 28 and collector 29 is determined by the setting of the movable tap 92 of potentiometer 16. In any event, the transistor 26 is rendered conductive and a current flows from the emitter electrode 28 to the base electrode 27. This circuit can be traced from the upper terminal of winding 24 through conductor 93, the lower portion of potentiometer 16, conductor 94, emitter 28 and base 27, and conductor 95 to the lower terminal of winding 24. Also, a current flows from the collector electrode to the base electrode. Therefore, the emitter to collector impedance of transistor 26 is relatively low. That is, a relatively low impedance shunts the potentiometer 16 and the net impedance as seen by voltage of photo voltaic cell between terminals 96 and 97 is now relatively low.

Consider now the half cycle of alternating voltage induced in winding 24 wherein the lower terminal of this winding is positive with respect to the upper terminal. A positive voltage is now applied to the base electrode 27 of transistor 26 and a negative voltage is applied to both the emitter electrode 28 and the collector electrode 29 of this transistor. Transistor 26 is now substantially cut off and therefore the emitter to collector impedance of this transistor is relatively high. In other words, the net impedance between the terminals 96 and 97 is now greatly increased.

As will be remembered, potentiometer 16, and therefore the impedance between terminals 96 and 97, is in series with the voltage source represented by the photo voltaic cell 11. Therefore, the load which the photo voltaic cell 11 sees varies in a cyclic manner from a relatively high value to a lower value.

The current flow circuit for photo voltaic cell 11 also includes the primary winding 12 and upon cell 11 being subjected to a flame, a pulsating direct current voltage flows through winding 12, thus inducing an alternating voltage in secondary winding 14. The frequency of the pulsations is determined by the frequency of oscillation of oscillator 17. In the absence of flame, no voltage is generated by photo cell 11 and therefore no voltage is induced in secondary winding 14.

The apparatus as above described is in the standby condition. In other words, there is no flame present at the burner unit 10 and therefore there is no output voltage from the photo voltaic cell 11. Oscillator 17 is continuously oscillating and the impedance between terminals 96 and 97 is varying in a cyclic manner. Transistor 30 is conducting in its quiescent condition as no alternating voltage is induced in the secondary winding 14 of transformer 13. Furthermore, there is no output voltage from the rectifying means 37 and therefore no voltage across capacitor 41. Transistor 42 is in its conducting state and, as above described, this in turn causes transistor 43 to be in a nonconducting state. Furthermore, there is no output voltage from the rectifying means 54 and therefore the winding 56 of relay 55 is de-energized.

If it is now assumed that a flame is established at the burner unit 10, the photo voltaic cell 11 senses or views this flame and a direct current voltage is generated by the photo voltaic cell. This voltage is applied to the series circuit including resistor 15, the impedance between terminals 96 and 97, and the primary winding 12 of transformer 13. The internal or generator resistance of photo cell can be considered to be part or all of resistor 15. Since the impedance between terminals 96 and 97 is varying in a cyclic manner, first being relatively high and then being relatively low, a direct current voltage of varying magnitude flows through the primary winding 12. This induces an alternating voltage in the secondary winding 14, this alternating voltage being of a frequency determined by the frequency of oscillation of the oscillator 17.

This voltage induced in the secondary winding 14 is applied between the base electrode 31 and the emitter electrode 32 of the transistor 30. This voltage is an alternating voltage and thereby causes an amplified alternating current to flow from the emitter 32 to the collector 33 of this transistor. This in turn causes an alternating current to flow through the primary winding 34 of the coupling transformer 35.

An alternating voltage is now induced in the secondary winding 36 of the coupling transformer 35 and this voltage is applied to the input terminals of the bridge rectifier 37. This voltage is rectified and appears at the output terminals 38 and 39 of the bridge rectifier and in turn causes a pulsating direct current to flow from terminal 38 through resistor 40 and capacitor 41 to the terminal 39. As this pulsating current continues to flow, the current is integrated and a voltage builds up across capacitor 41 such that the upper terminal of this capacitor is positive with respect to the lower terminal. After a time period necessary to charge capacitor 41 to a given value, the base electrode 44 has a sufficiently high positive voltage applied thereto such that transistor 42 is cut off. This increases the emitter to collector impedance of transistor 42 and causes the potential of collector 48 to approach the potential of negative terminal 63. This causes the base electrode 45 of transistor 43 to be effectively connected to the negative voltage present on terminal 63 of the power supply through a circuit traced from conductor 80 to resistor 68, and conductors 77, 78 and 79 to the negative terminal 63.

Transistor 43 is now rendered conductive, a current flowing both from the emitter 47 to the base 45 and from the emitter 47 to the collector 49. The emitter to collector current of this transistor can be traced from positive power supply terminal 62 through conductor 70, resistor 81, emitter 47 and collector 49, resistor 98, resistor 90, and conductors 78 and 79 to the negative power supply terminal 63. This above traced current flow causes a voltage to be developed across resistor 90 which is of a polarity to cause the lower terminal to be positive with respect to the upper terminal of this resistor.

The positive voltage on the lower terminal of resistor 90 is applied to the base electrode 44 of transistor 42 through a further resistor 143. This further causes transistor 42 to be cut off thus making a true flip-flop action.

The voltage developed across resistor 98, as above described, is utilized in a self-checking circuit including a transistor 100 having a base electrode 101, an emitter electrode 102, and a collector electrode 103. The upper terminal of resistor 98, that is the negative terminal, is connected through conductors 104, 105 and 106 to the base electrode 101 of transistor 100. The lower or positive, terminal of resistor 98 is connected by means of conductors 107 and 108 to the emitter electrode 102 of transistor 100. This causes an emitter to base current to flow in transistor 100 and therefore appreciably reduces the base to collector impedance of this transistor. The base 101 of transistor 100 is directly connected by means of a conductor 110 to the positive terminal of the photo voltaic cell 11. The collector electrode 103 is connected through conductor 111 and resistor 15 to the negative terminal of the photo voltaic cell. Therefore, the base to collector circuit of transistor 100 effectively shunts the photo voltaic cell 11 through the voltage dropping resistor 15 and in this manner simulates the absence of flame at the burner unit 10 since substantially the total output voltage of the photo voltaic cell is dropped across the voltage dropping resistor 15. Therefore, a current no longer flows to the primary winding 12 of transformer 13 and alternating voltage is no longer induced in the secondary winding 14, to be amplified by transistor 30 and to be rectified by rectifying means 37. The voltage on capacitor 41 therefore starts to decrease.

After a given time period, the voltage on capacitor 41 reduces to the point where transistor 42 is again rendered conductive. This switch over is aided by resistor 143. As above described, with transistor 42 in its conductive state the emitter to collector impedance of this transistor is appreciably reduced and the base and emitter of transistor 43 are essentially at the same potential level. This causes transistor 43 to be cut off and therefore the emitter to collector current no longer flows. As will be remembered, the emitter to collector current of this transistor 43 is the current which caused the voltage to be developed across resistor 98, which in turn caused the simulation of the absence of flame at the burner unit 10, through the action of transistor 100.

Therefore, since the voltage no longer exists across resistor 98, the base to collector impedance of transistor 100 again increases to the point where it has negligible shunting effect on the photo electric cell 11. Therefore photo electric cell 11 is again effective to sense the presence of flame at the burner unit 10 and once again an alternating voltage is induced in the secondary winding 14 of transformer 13.

Thus far, a single cycle of operation of the improved condition responsive apparatus has been explained wherein the photo voltaic cell 11 is first effective to sense the presence of flame at the burner unit 10 and thereby cause a direct current voltage to be produced across resistor 98. It has been explained how this direct current voltage causes the photo voltaic cell 11 to be shunted and thereby to simulate the absence of flame at the burner unit 10. This in turn causes the direct current voltage across resistor 98 to disappear and as a result thereof photo voltaic cell 11 was again rendered sensitive to detect the presence of flame at the burner unit 10.

Thus far the operation of the improved condition responsive apparatus has been described neglecting the operation of the output relay 55. Output relay 55 is energized from a transformer 51 having a primary winding 52 which is connected from the positive output terminal 62 of the power supply and through a capacitor 120, to the collector electrode 49 of transistor 43. As has been pointed out, the transistor 43 cycles from a conducting to a nonconducting state when the photo voltaic cell 11 is subjected to a flame at the burner unit 10. Therefore, the collector electrode 49 of transistor 43 is first at a high potential level, with respect to terminal 62, when transistor 43 is in a nonconductive state. When transistor 43 is rendered conductive, the potential of the collector electrode 49 is appreciably reduced, with respect to terminal 62, and in fact approaches the potential of the positive output terminal 62. In this manner, a fluctuating direct current voltage is supplied across the series connected transformer primary winding 52 and capacitor 120. This causes an alternating voltage to be induced in the secondary winding 53 of this transformer. This alternating voltage is rectified by the rectifying means 54 and in turn causes the winding 56 of relay 55 to be energized to thereby cause switch means 57 to close as a result of the presence of flame at the burner unit 10.

If for any reason one or more components fail within the improved condition responsive apparatus, such that the transistor 43 is not rendered conductive and then nonconductive in a cycling rate, the winding 56 of relay 55 is de-energized. The cycling of transistor 43 is indicative of the fact that the condition responsive apparatus is capable of first responding to the presence of flame at the burner unit 10, as sensed by the photo voltaic cell 11, and then capable of responding to the simulated absence of flame at the burner unit 10, due to the action transistor 100. Therefore, means are provided to check proper operation of the unit, insuring that the unit is operable to both detect the presence and absence of flame at the burner unit 10. It is only when the flame is present at the burner unit 10, such that a period of sensing of the flame is followed by a period of simulated absence of flame, which causes the transistor 43 to cycle between a conducting and nonconducting state, that the relay winding 56 of relay 55 may be energized.

It can therefore be seen that I have provided a new and improved condition responsive apparatus in which means are provided to check proper operation of the apparatus.

Other modifications of the present invention will be apparent to those skilled in the art and it is intended that my invention be limited solely by the scope of the appended claims.

I claim as my invention:

1. Condition responsive apparatus comprising; condition responsive means including sensing means adapted to be subjected to a given condition and constructed and arranged to provide an alternating signal voltage when subjected to the given condition and including rectifying means connected to said condition responsive means to derive a direct current voltage upon said condition responsive means providing said alternating signal voltage, integrating means connected to said condition responsive means to integrate said direct current voltage, an electronic flip-flop circuit having an input and an output, means connecting the input of said flip-flop circuit to the output of said integrating means to thereby cause said flip-flop circuit to assume a first condition upon the absence of an output from said integrating means and to assume a second condition upon the presence of an output from said integrating means, further means connected to and controlled by said flip-flop circuit in said second condition to render said condition responsive means inoperative to sense the presence or absence of the given condition to thereby cause the simulated absence of the given condition and to thereby cause said flip-flop circuit to alternate between said first and second condition, and further means responsive to the continued alternation of said flip-flop circuit between said first and second position.

2. Flame responsive apparatus comprising; flame responsive means including flame sensing means arranged to be subjected to the presence of flame in a given area and constructed and arranged in a manner to provide a direct current voltage upon said flame sensing means being subjected to a flame, integrating means, means connecting said integrating means to said flame responsive means to thereby integrate said direct current voltage, an electronic flip-flop circuit having a first and a second condition of operation, means connecting the input of said flip-flop circuit to said integrating means to thereby cause said flip-flop circuit to assume said first condition upon the absence of a direct current voltage output from said integrating means and to assume said second position upon there being a direct current voltage output from said integrating means, further means controlled by said flip-flop circuit and constructed and arranged to render said flame responsive means inoperative to thereby simulate the absence of flame, said flip-flop circuit thereby alternating between said first and second conditions upon said flame responsive means being subjected to a flame, and further means controlled by said flip-flop circuit and responsive only to continued cycling of said flip-flop circuit between said first and second conditions.

3. Condition responsive apparatus comprising; condition responsive means including condition sensing means constructed and arranged in a manner to provide an alternating signal voltage upon said condition sensing means being subjected to a given condition, rectifying means, means connecting said rectifying means to said condition responsive means to thereby produce a direct current voltage upon said condition sensing means being subjected to the given condition, integrating means, means connecting said integrating means to said rectifying means to thereby integrate the direct current output voltage of said rectifying means, a first and a second transistor each having an emitter, a base, and a collector element, a source of direct current voltage having a positive terminal and a negative terminal, circuit means connecting the emitter electrodes of said first and second transistors to said positive terminal, circuit means connecting said collector electrodes of said first and second transistors to said negative terminal, circuit means connecting said base element of said second transistor to said collector element of said first transistor to thereby control the emitter to collector current of said second transistor in accordance with the emitter to collector impedance said first transistor, circuit means connecting said base and emitter electrodes of said first transistor to the output of said integrating means in such a manner as to render said first transistor nonconductive upon a voltage being present at the output of said integrating means to thereby render said second transistor conductive, further means controlled by said second transistor and arranged to simulate the absence of the given condition at said condition sensing means upon an output voltage appearing at the output of said integrating means, and further means including a transformer having a primary winding connected from said positive terminal to said collector electrode of said second transistor to thereby cause an alternating voltage to be induced in the secondary winding of said transformer upon said condition sensing means alternately sensing the given condition and the simulated absence of the given condition.

4. Electromagnetic wave responsive means comprising; a photo voltaic cell arranged to be subject to electromagnetic wave energy and capable of providing a direct current voltage in response thereto, means including an oscillator constructed and arranged in a manner to chop the direct current output voltage of said photo voltaic cell and produce an alternating voltage, means for amplifying said alternating voltage, means for rectifying said amplified alternating voltage, integrating means to integrate said rectified voltage, an electronic flip-flop circuit having an input and an output, means connecting said input to said integrating means to thereby cause said flip-flop circuit to assume a first condition upon the absence of an output voltage at said integrating means and to assume a second position upon the presence of an output at said integrating means, further means controlled by said flip-flop circuit in said second condition arranged to simulate the absence of electromagnetic wave energy at said photo voltaic cell and thereby cause said flip-flop circuit to assume said first condition, and further means connected to the output of said flip-flop circuit and energized only upon said flip-flop circuit alternately cycling between said first and second conditions.

5. Condition responsive means comprising; a photo voltaic cell arranged to be subjected to electromagnetic wave energy to produce a direct current voltage in response thereto, a first transformer having a primary and a secondary winding, a first transistor having a base, an emitter and a collector electrode, circuit means connecting the primary winding of said first transformer, said photo voltaic cell, and said first transistor emitter and collector electrodes in a series circuit, an oscillator, means connecting the output of said oscillator to said first transistor to thereby control the emitter to collector impedance of said first transistor in a cyclic manner and to thereby cause an alternating voltage to be induced in the secondary winding of said first transformer upon said photo voltaic cell being subjected to the wave energy, amplifying means connected to the secondary winding of said first transformer and arranged to amplify the alternating voltage induced therein, rectifying means having an input and an output, means connecting the input of said rectifying means to the output of said amplifying means to thereby rectify the amplified alternating voltage induced in the secondary winding of said first transformer, a series connected resistor and capacitor connected to the output terminals of said rectifying means, the voltage across said capacitor thereby being an integration of the output voltage of said rectifying means, a second and a third transistor each having base, emitter, and collector electrodes, a source of direct current voltage having a positive terminal and a negative terminal, circuit means connecting the emitter electrodes of said second and third transistors to said positive terminal, circuit means connecting the collector electrodes of said second and third transistors to said negative terminal, circuit means connecting the base electrode of said third transistor to the collector electrode of said second transistor to thereby control the conduction of said third transistor in accordance with the state of conduction of said second transistor, circuit means connecting said base and collector electrodes of said second transistor to said capacitor in such a manner that said base electrode is rendered positive as said capacitor is charged by said rectifying means, said second transistor thereby being rendered nonconductive and said third transistor being rendered conductive upon said photo voltaic cell being subjected to the wave energy, a fourth transistor having base, emitter and collector electrode, circuit means connecting said fourth transistor collector and base electrodes to shunt said photo voltaic cell, circuit means connecting said fourth transistor base and emitter electrodes to said third transistor such that the collector to base impedance of said fourth transistor is substantially reduced upon said third transistor being rendered conductive, to thereby simulate the absence of the wave energy, and further means including a transformer having a primary winding and a further capacitor connected in series between said positive terminal and the collector electrode of said third transistor, said second transformer having a voltage induced in a secondary winding thereof only upon said third transistor being rendered conductive and then nonconductive in a cyclic manner.

6. Condition responsive apparatus comprising; condition responsive means including means arranged to derive a direct current voltage upon said condition responsive means being subject to a given condition; a first and a second transistor having base, emitter and collector electrodes, a source of direct current voltage having a positive and a negative terminal, circuit means connecting the emitter electrodes of said first and second transistors to said positive terminal, circuit means connecting the collector electrodes of said first and second transistor to said negative terminal, circuit means connecting the base electrode of said second transistor to the collector electrode of said first transistor to thereby control the conduction of said second transistor in accordance with the state of conduction of said first transistor, circuit means connecting said base and emitter electrodes of said first transistor to said condition detecting means to thereby apply said direct current voltage thereto in a manner to cause said first transistor to assume a nonconducting state upon said condition responsive means being subjected to the given condition, means controlled by said second transistor and connected to said condition responsive means to simulate the absence of the given condition upon said first transistor being rendered nonconductive, to thereby cause the conductivity of said second transistor to cycle between two conditions, and output means controlled by said second transistor and responsive to the condition wherein the conductivity of said second transistor cycles between said two conditions.

7. Condition responsive apparatus comprising; condition sensing means arranged to be subjected to a given condition; signal amplifying means having an input and an output; circuit means connecting said condition sensing means to said amplifying means input to apply a signal voltage thereto upon said condition sensing means being subjected to the given condition, said amplifying means output having an output voltage thereon dependent upon said condition sensing means being subjected to the given condition; further means connected to and controlled by said amplifying means when the latter has said output thereon to render said condition responsive means inoperative to sense the presence or absence of the given condition and to thereby cause cycling of the output voltage of said amplifying means as long as said condition sensing means is subjected to the given condition, said further means comprising semi-conductor means having an input electrode, an output electrode, and a common electrode, circuit means connecting said common electrode and said input electrode to said amplifying means output, and circuit means connecting said common electrode and said output electrode in controlling circuit with said condition sensing means to render said condition sensing means inoperative to sense the presence of the given condition; and further means responsive only to the continuous cycling of the output voltage of said signal amplifying means.

No references cited.